United States Patent Office 3,836,497
Patented Sept. 17, 1974

3,836,497
PROCESS FOR THE PRODUCTION OF HIGH SURFACE TENSION SPECK-FREE, HEAT-POLYMERIZED SYNTHETIC RESIN DISPERSIONS
Ulrich Turck, Marl, Germany, assignor to Chemische Werke Huels, A.G., Marl, Germany
No Drawing. Continuation-in-part of abandoned application Ser. No. 130,012, Mar. 31, 1971. This application Mar. 21, 1973, Ser. No. 343,448
Claims priority, application Germany, Apr. 2, 1970, P 20 15 660.9
Int. Cl. C08d 7/18; C08f 37/00, 45/54
U.S. Cl. 260—29.7 SQ          12 Claims

ABSTRACT OF THE DISCLOSURE

Speck-free high surface tension dispersions of emulsion polymerized styrene-butadiene copolymers and other heat-polymerized synthetic resins containing a plasticizing component and a hardening component are produced by employing as the emulsifier for the polymerization 0.3–4% by weight of the monomers of a salt of an α-sulfo-straight chain alkanoic acid containing 10–20 carbon atoms or of an ester thereof with an alcohol containing 1–3 carbon atoms.

BACKGROUND OF THE INVENTION

This is a continuation-in-part of Application S.N. 130,012, filed Mar. 31, 1971, now abandoned.

This invention relates to a process for the production of high surface tension speck-free, heat-polymerized synthetic resin dispersions.

In the manufacture of synthetic resin dispersions by aqueous emulsion polymerization, emulsifiers are added to the polymerization charge to form and maintain the dispersion. However, the emulsifiers conventionally employed adversely affect the properties of the finished synthetic resin dispersion.

In order for synthetic resin dispersions to have good processability, they should have as high a surface tension as possible. Dispersions with high surface tensions also form waterproof, uniform films. High surface tensions are also desirable for supressing foam formation, which can lead, for example, on high-speed machines, to considerable processing difficulties. High surface tensions are especially required in case of latices containing carboxyl groups which are neutralized after the manufacture thereof because the surface tension of the dispersion is lowered by this procedure.

Dispersions with high surface tensions can be produced by the use of a small amount of anionic detergent as the emulsifier. However, such dispersions are not particularly stable and they tend to coagulate or have a high speck content. In order to limit the reduction of surface tension to within acceptable limits during the neutralization of latices containing carboxyl groups, part of the anionic detergent can be replaced by a nonionic detergent. However, a thus-emulsified latex still has a low surface tension.

In the production of high solids dispersions, there always occurs a proportion of coagulate or specks. Due to the fact that such specks can be removed only with difficulty, they are particularly undesirable. These compact particles, the diameter of which is on the order of magnitude of 10–100μ, impart to coatings produced from the dispersions an undesirable lack of homogeneity and cause difficulties during processing. The coagulate and speck proportion of such high solids dispersions can be lowered by employing large amounts of emulsifier in the polymerization. However, a high emulsifier content results in the formation of dispersions having a low surface tension so that the coatings produced therefrom are not acceptably waterproof. (See Houben-Weyl, Vol. XIV/1 (1961), p. 202).

U.S. 3,272,767 discloses the use of sulfonated alkyl esters of long chain fatty acids as an ionic surface-active dispersion agents in the aqueous emulsion polymerization of synthetic rubber forming monomers.

U.S. 3,408,373 discloses as surface active agents branched chain α-sulfo-alkanoic acids, containing 12–22 carbon atoms.

U.S. 3,393,213 relates to surface active esters containing a total of about 12 to 32 carbon atoms of branched chain α-sulfo-alkanoic acids of 4–16 carbon atoms.

This prior art suggests nothing relative to the use of salts α-sulfo-linear alkanoic acids and their esters in the emulsion polymerization of a mixture of monomers containing both plasticizing and hardening components.

It is the object of this invention to produce synthetic resin dispersions which have a high surface tension and are substantially free of specks and coagulate. Other objects will be apparent to those skilled in the art to which this invention pertains.

SUMMARY OF THE INVENTION

According to this invention, high surface tension aqueous resin dispersions which are substantially free of specks are produced by employing as the emulsifier for the polymerization 0.3–4% by weight, calculated on the mixture of monomers employed to produce the resin, of a salt of an α-sulfo fatty acid containing 10–20 carbon atoms or an ester thereof with an alcohol containing 1–3 carbon atoms.

DETAILED DISCUSSION

The emulsifiers employed in the process of this invention are the surface active mono- and di-salts of α-sulfo fatty acids containing 10–20 carbon atoms and mono-salts of esters thereof with alcohols containing 1–3 carbon atoms. The term "fatty acid" as used herein means a linear alkanoic acid. Thus, the emulsifiers of this invention have the formula

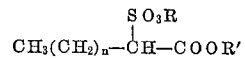

wherein $n$ is an integer from 8–18 inclusive, R is an ammonium or metal ion and R′ is H or alkyl of 1–3 carbon atoms or an ammonium or metal ion. Preferred are acids containing 16–18 carbon atoms. Examples of suitable salts are the ammonium, alkali-metal, e.g., lithium, sodium, potassium or salts and mixtures thereof. Especially preferred are the mono- and disodium salts of the $C_{16}$ to $C_{18}$-fatty-acid-α-sulfonates.

The dispersions produced according to this invention contain 25–90% by weight, preferably 50–75% by weight of one or more hardening components. Such hardening components include the vinylaryl monomers conventionally employed for the production of hard, relatively brittle homopolymers, including the vinylbenzenes, e.g., styrene and substituted styrenes, e.g., α-alkyl-substituted styrenes, including α-methylstyrene, nuclear substituted styrenes, including 3-methylstyrene, 2,4-dimethylstyrene, 2,4,6-trimethylstyrene, and mixtures thereof. Up to 40% of the hardening agent can be acrylonitrile. Styrene is the preferred hardening component.

The dispersions of this invention also contain 10–75% by weight, preferably 25–50% by weight, of one or more plasticizing components. Suitable plasticizing components include the 1,3-dienes conventionally employed to produce rubbery homopolymers, e.g., 1,3-butadiene, isoprene, piperylene, 2,3-dimethyl-1,3-butadiene, 2-methyl-1,3 - pentadiene, chloroprene, 1-cyanobutadiene, 2,3-dimethyl-1,3-pentadiene, 2-methyl-3-ethyl-1,3-pentadiene, 2-methoxybutadiene and 2-phenylbutadiene, and mixtures thereof. Others are the acrylic acid esters or methacrylic acid esters of alcohols containing 4–8 carbon atoms, and/or mixtures thereof with a diene. Butadiene is preferred. In addition, the resins in the dispersions can contain up to 5% by weight of an $\alpha,\beta$-unsaturated carboxylic acid or amide thereof or a mixture thereof, e.g., acrylic, methacrylic, fumaric and itaconic acid, and acrylic acid amide and methacrylic acid amide. Acrylic acid and acrylic acid amide are preferred.

Typical synthetic resin dispersions which can be produced using the emulsifiers of this invention are those in which the ratio of styrene or other hardening component to butadiene or other plasticizing component is about 2:1 to 1:1.

As is conventional, an activator for the polymerization is employed, such as, for example, a water-soluble free-radical forming agents, e.g., ammonium peroxydisulfate or potassium peroxydisulfate, optionally in combination with sodium bisulfite, or a redox system, e.g., cumene hydroperoxide/"Rongalite" (TM for the sodium-form aldehyde-sulfoxylate).

The polymerization temperature generally is between 40 and 90° C., preferably between 50 and 80° C. The pH of the reaction mixture is usually about 1.5 to 8, which can be adjusted as desired.

Emulsifiers containing sulfonate groups, e.g., $C_{15}$-paraffin sulfonates ("Mersolate" K 30) and alkyl diphenyl ether sulfonates ("Dowfax"), are known. However, the use of these emulsifiers produce dispersions having high proportions of coagulate and a low surface tension. It was surprising that, in contradistinction thereto, salts of $\alpha$-sulfofatty acids and of $\alpha$-sulfofatty acid esters, produce dispersions having such excellent properties, including high surface tension and substantial freedom from specks e.g., less than 0.01%, and low coagulate content, e.g., less than 2% and usually less than 1%.

A further advantage when using the emulsifiers of this invention resides in that the resin particles of the dispersions thus-produced have a radius of about 50–60 m$\mu$. Consequently, the polymerization occurs rapidly so that it can be terminated in about 10 hours. Additionally, small particles are very advantageous with respect to the film-forming properties of the dispersion.

The surface tension of the latices is generally at least 60 and usually at least 65 dynes/cm., and after adjustment to a pH of 8.5, about 50–65 dynes/cm. The dispersions are substantially speck-free, i.e., less than 0.01% content. Coagulant content is less than 2% and usually less than 1%.

The dispersions produced with the aid of the emulsifiers employed according to this invention are suitable as coating compositions for paper, textiles and as binders for coating agents, e.g., a coating composition comprising a speck-free aqueous dispersion having a coagulate content of less than 1% and a surface tension of about 50 to 70 dynes/cm. of an emulsion polymerizate of a mixture of monomers comprising styrene and either butadiene, an ester of acrylic acid of methacrylic acid and an alcohol containing 4–6 carbon atoms or a mixture thereof, especially those wherein the polymerizate is a mixture of monomers consisting of 25–90% by weight of a mixture of styrene and 0–40% acrylonitrile and 75 to 10% of butadiene or an ester of acrylic acid or methacrylic acid and an alcohol containing 4–8 carbon atoms or a mixture thereof.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

The following components are charged into a 150-liter polymerization reactor (stainless steel):

100 parts by weight of water
2 parts by weight of disodium $C_{16}/C_{18}$-fatty-acid-$\alpha$-$\alpha$-sulfonate
66.5 parts by weight of water styrene
1.5 parts by weight of acrylic acid
0.5 parts by weight of tert.-dodecyl mercaptan
0.5 parts by weight of ammonium peroxydisulfate After purging three times with nitrogen and subsequent evacuation, 32 parts by weight of butadiene are then added.

Within two hours, the charge is heated to 70° C. After 11 hours, the reaction is terminated. The dispersion contains only 0.08% coagulate and does not contain any specks. The dry solids content is 50.9% and the surface tenison is 67 dynes/cm. By the addition of ammonia, the pH is increased from 4.7 to 8.5, which decreases the surface tension to 57 dynes/cm.

EXAMPLE 2

A 12-liter polymerization reactor of stainless steel is charged as described in Example 1, except that the monosodium salt of the sulfonate emulsifier, which is produced from the disodium salt by acidifying with sulfuric acid, is employed.

Within 15 minutes, the temperature is brought to 70° C. The reaction is terminated after 9½ hours. The coagulate content is 0.7%. The dispersion contains no specks. The dry solids content is 51% and the surface tension is 66 dynes/cm. at a pH of 2.3. After adjustment to a pH of 8.5, the surface tension is 56 dynes/cm.

EXAMPLE 3

The following constituents are charged into a 12-liter polymerization reactor of stainless steel:

200 parts by weight of water
0.5 parts by weight of disodium $C_{16}/C_{18}$-fatty-acid-$\alpha$-sulfonate
66 parts by weight of styrene
2 parts by weight of acrylic acid
0.5 parts by weight of tert.-dodecyl mercaptan
0.5 parts by weight of ammonium persulfate After purging three times with nitrogen and subsequent evacuation, 32 parts by weight of butadiene is added.

The temperature is brought to 70° C. After 9 hours, the reaction is terminated. The dispersion is free of specks. Coagulate content is 0.5%. The solids content is 33.7% and the surface tension is 70 dynes/cm. at a pH of 2.8 and 62 dynes/cm. at a pH of 8.5.

EXAMPLE 4

A 12-liter stainless steel polymerization reactor is charged and operated as described in Example 3, except that 3.0 parts by weight of emulsifier is employed.

The reaction is terminated after 9 hours. The dispersion is free of specks and contains 0.6% of coagulate. The dry solids content is 34.6%. The surface tension is 63 dynes/cm. at a pH of 4.7 and 54 dynes/cm. at a pH of 8.5.

EXAMPLE 5

The following is charged into a 12-liter stainless steel polymerization reactor:

150 parts by weight of water
1.5 parts by weight of disodium $C_{16}/C_{18}$-fatty-acid-$\alpha$-sulfonate
90 parts by weight of styrene
0.5 parts by weight of tert.-dodecyl mercaptan
0.5 parts by weight of ammonium persulfate After purging three times with nitrogen and subsequent evacuation, 10 parts by weight of butadiene is added.

The temperature is brought to 70° C. The reaction is terminated after 3½ hours. Coagulate content is 1%. The dispersion is speck-free and has a dry solids content of 41.0%. The surface tension is 70 dynes/cm. at a pH of 6.2.

EXAMPLE 6

The following components are charged into a 12-liter stainless steel polymerization reactor:

150 parts by weight of water
2 parts by weight of disodium $C_{16}/C_{18}$-fatty-acid-$\alpha$-sulfonate
25 parts by weight of styrene
0.5 parts by weight of tert.-dodecyl mercaptan
0.25 parts by weight of cumene hydroperoxide
0.2 parts by weight of "Rongalite" ($CH_2O \cdot NaHSO_2 \cdot H_2O$)

After purging three times with nitrogen and subsequent evacuation, 75 parts by weight of butadiene is added.

The temperature is brought to 70° C. After 22½ hours, the reaction is terminated. Coagulate content is 0.5%. The dispersion is speck-free and has a dry solids content of 40.9%. The surface tension is 71 dynes/cm. at a pH of 7.7.

EXAMPLE 7

The following components are charged into a 12-liter stainless steel polymerization reactor:

1.5 parts by weight of water
1.5 parts by weight of disodium $C_{16}/C_{18}$-fatty-acid-$\alpha$-sulfonate
58 parts by weight of styrene
40 parts by weight of 2-ethylhexyl acrylate
2 parts by weight of acrylic acid
0.5 parts by weight of tert.-dodecyl mercaptan
0.5 parts by weight of ammonium persulfate After purging three times with nitrogen and subsequent evacuation, the temperature is brought to 70° C. within two hours. The reaction is terminated after 8 hours. The emulsion is free of specks and contains 1.5% of coagulate. Dry solids content is 40.5% and the surface tension is 66 dynes/cm. at a pH of 4.0.

EXAMPLE 8

A 12-liter stainless steel polymerization reactor is charged as described in Example 3, except 2.0 parts by weight of emulsifier is employed. The temperature is brought to 40° C., and 0.1 part by weight of sodium metabisulfite is added thereto. After 25 hours, the reaction is terminated. A post-activation step is conducted three times with 0.25 part by weight of ammonium persulfate and 0.05 part by weight of sodium metabisulfite. The proportion of coagulate is 2%. The dispersion is free of specks and has a dry solids content of 34.0%. The surface tension is 61 dynes/cm. at a pH of 4.7 and 46 dynes/cm. at a pH of 8.5.

EXAMPLE 9

The following components are charged into a 12-liter stainless steel polymerization reactor:

150 parts by weight of water
1 parts by weight of monosodium $C_{12}$-fatty-acid-$\alpha$-sulfonate
66.5 parts by weight of styrene
1.5 parts by weight of acrylic acid
0.5 parts by weight of tert.-dodecyl mercaptan
0.5 parts by weight of ammonium persulfate After purging three times with nitrogen and evacuation, 32 parts by weight of butadiene is added.

The temperature is brought to 60° C., and 0.1 part by weight of sodium metabisulfite is added. The reaction is terminated after 13 hours. A post-activating step is conducted once with 0.25 part by weight of ammonium persulfate and 0.05 part by weight of sodium metabisulfite. The proportion of coagulate is 1%. The speck-free dispersion has a dry solids content of 41.7%. The surface tension is 72 dynes/cm. at a pH of 2.3 and 66 dynes/cm. at a pH of 8.5.

EXAMPLE 10

A 12-liter stainless steel polymerization reactor is charged as described in Example 9, except that 1.5 parts by weight of sodium - $C_{16}$ - fatty-acid-methyl-ester - $\alpha$-sulfonate is employed as emulsifier. At a temperature of 65° C., the reaction is terminated after 10 hours. Coagulate content is 1.5%. The dispersion is free of specks and has a dry solids content of 41.4%. The surface tension is 70 dynes/cm. at a pH of 2.4 and 66 dynes/cm. at a pH of 8.5.

EXAMPLE 11

The following are charged into a 12-liter stainless steel polymerizable reactor:

150 parts by weight of water
2 parts by weight of disodium $C_{16}/C_{18}$-fatty-acid-$\alpha$-sulfonate
30 parts by weight of styrene
20 parts by weight of acrylonitrile
2 parts by weight of acrylic acid
0.4 parts by weight of ammonium persulfate After purging three times with nitrogen and evacuation, 48 parts by weight of butadiene is added.

The temperature is brought to 60° C. After 13½ hours, the reaction is terminated. The dispersion is speck-free and contains 0.9% coagulate. Dry solids content is 40.3% and the surface tension is 62 dynes/cm. at a pH of 4.5 and 52 dynes/cm. at a pH of 8.5.

EXAMPLE 12

The following are charged into a 12-liter stainless steel polymerization reactor:

150 parts by weight of water
2 parts by weight of disodium $C_{16}/C_{18}$-fatty acid-$\alpha$-sulfonate
61 parts by weight of styrene
3 parts by weight of acrylamide
1 part by weight of acrylic acid
0.5 part by weight of ammonium persulfate After purging three times with nitrogen and evacuation, 35 parts by weight of butadiene is added.

The temperature is brought to 70° C. within one hour. The reaction is terminated after 10 hours. The dispersion is free of coagulate and is free of specks. The dry solids content is 40.8% and the surface tension is 64 dynes/cm. at a pH of 4.6 and 56 dynes/cm. at a pH of 8.5.

COMPARATIVE EXAMPLE A

A 12-liter stainless steel polymerization reactor is charged and operated as described in Example 2, except a $C_{15}$-paraffin sulfonate ("Mersolate" K 30) is employed as the emulsifier.

The thus-obtained emulsion is very viscous. Coagulate content is 6.5% and the surface tension is 60 dynes/cm. at a pH of 2.0 and 42 dynes/cm. at a pH of 8.5. Dry solids content is 51.2%.

COMPARATIVE EXAMPLE B

A 12-liter stainless steel polymerization reactor is charged and operated as set forth in Example 3, except the emulsifier employed is alkyl diphenyl ether sulfonate ("Dowfax"). Dry solids content is 49.5%. Coagulate content is 10%. The thus-obtained dispersion is so viscous a surface tension value cannot be obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of high surface tension aqueous dispersions which are speck-free, of a heat-polymerized synthetic resin by emulsion polymerization of a mixture of monomers comprising as a hardening component 10–75% by weight of at least one vinylaryl monomer which forms hard, relatively brittle homopolymers or a mixture thereof with up to 40% by weight of acrylonitrile, and as a plasticizing component, 25–90% by weight of at least one 1,3-diene monomer which forms rubbery homopolymers or an ester or mixture of esters of acrylic acid or methacrylic acid and an alcohol containing 4–8 carbon atoms, or a mixture thereof and said 1,3-diene, the improvement wherein the emulsifier for the polymerization consists essentially of about 0.3–4% by weight, based on the mixture of monomers, of a mono- or diammonium or alkali metal salt of a linear $\alpha$-sulfo-fatty-acid containing 10–20 carbon atoms or a mono-ammonium or alkali metal salt of an ester thereof with an alcohol containing 1–3 carbon atoms.

2. A process according to Claim 1 wherein the emulsifier is an ammonium or alkali-metal salt of an $\alpha$-sulfo-fatty acid containing 16–18 carbon atoms.

3. A process according to Claim 2 wherein the emulsifier is a sodium salt.

4. A process according to Claim 1 wherein about 0.5–3% by weight of the emulsifier is employed.

5. A process according to Claim 1 wherein the vinylaryl monomer is styrene.

6. A process according to Claim 1 wherein the starting monomer comprises up to 5% by weight of an $\alpha,\beta$-unsaturated carboxylic acid, or the amide thereof or a mixture thereof.

7. A process according to Claim 6 wherein the starting mixture of monomers comprises acrylic acid, methacrylic acid, fumaric acid or itaconic acid.

8. A process according to Claim 6 wherein the starting mixture of monomers comprises an amide of acrylic acid or methacrylic acid.

9. A coating composition comprising a speck-free aqueous dispersion having a coagulate content of less than 1% and a surface tension of about 50 to 70 dynes/cm. of an emulsion polymerizate of a mixture of monomers comprising styrene and either butadiene, an ester of acrylic acid or methacrylic acid and an alcohol containing 4–6 carbon atoms, or a mixture thereof.

10. A coating composition according to Claim 9 wherein the polymerizate is a mixture of monomers consisting of 25–90% by weight of a mixture of styrene and 0–40% acrylonitrile and 75 to 10% of butadiene or an ester of acrylic acid or methacrylic acid and an alcohol containing 4–8 carbon atoms, or a mixture thereof.

11. A process according to Claim 1 wherein the hardening component consists essentially of styrene and the plasticizing component consists essentially of butadiene and the starting monomer mixture comprises up to 5% by weight of an $\alpha,\beta$-unsaturated carboxylic acid, or the amide thereof or a mixture thereof.

12. A process according to Claim 11 wherein the emulsifier is the sodium salt of a linear $\alpha$-sulfofatty acid containing 16–18 carbon atoms.

References Cited
UNITED STATES PATENTS

| | | | |
|---|---|---|---|
| 3,272,767 | 9/1966 | Howland et al. | 260—84.3 |
| 3,393,213 | 7/1968 | Kiefer | 260—400 |
| 3,408,373 | 10/1968 | Ault et al. | 260—400 |
| 3,432,455 | 3/1969 | Rasicci | 260—29.7 SQ |
| 3,627,717 | 12/1971 | Kuhnen | 260—29.7 SQ |

ALLAN LIEBERMAN, Primary Examiner

T. DeBENEDICTIS, Sr., Assistant Examiner

U.S. Cl. X.R.

260—29.6 H, T, Z, 29.7 H, 399, 400